US010166620B2

(12) United States Patent
Steel, III

(10) Patent No.: US 10,166,620 B2
(45) Date of Patent: Jan. 1, 2019

(54) SLAG REMOVAL SYSTEM AND METHOD

(71) Applicant: Slag Rebel LLC, San Antonio, TX (US)

(72) Inventor: Harry Van Steel, III, San Antonio, TX (US)

(73) Assignee: Slag Rebel LLC, San Antonio, TX (US)

( * ) Notice: Subject to any disclaimer, the term of this patent is extended or adjusted under 35 U.S.C. 154(b) by 164 days.

(21) Appl. No.: 15/286,381

(22) Filed: Oct. 5, 2016

(65) Prior Publication Data

US 2017/0291241 A1 Oct. 12, 2017

Related U.S. Application Data

(60) Provisional application No. 62/320,244, filed on Apr. 8, 2016.

(51) Int. Cl.
B23K 7/10 (2006.01)
(52) U.S. Cl.
CPC ..................................... B23K 7/10 (2013.01)

(58) Field of Classification Search
CPC ......... F23D 14/50; B08B 9/021; B08B 9/027; B08B 2209/04; B23K 9/328
USPC ....... 266/48, 49, 50; 219/136; 15/406; 134/8
See application file for complete search history.

(56) References Cited

U.S. PATENT DOCUMENTS

| 3,934,303 | A | * | 1/1976 | Neithercutt | ............. | F23D 14/50 |
| | | | | | | 15/406 |
| 4,065,045 | A | | 12/1977 | Pray | | |
| 4,384,511 | A | | 5/1983 | Mefferd | | |
| 5,965,040 | A | | 10/1999 | Luo et al. | | |
| 2006/0065284 | A1 | | 3/2006 | Langeder et al. | | |
| 2010/0163765 | A1 | | 7/2010 | Gregoire | | |

* cited by examiner

Primary Examiner — Scott R Kastler
Assistant Examiner — Michael Aboagye
(74) Attorney, Agent, or Firm — Slater Matsil, LLP

(57) ABSTRACT

A device to unclog orifices in a workpiece is provided. The device includes a lower portion configured to receive the workpiece and an upper portion configured to secure the workpiece to the lower portion. The upper portion includes a tube configured to receive a piston. An unclogging material is placed in the tube portion, and the piston forces the unclogging material through the orifices.

20 Claims, 14 Drawing Sheets

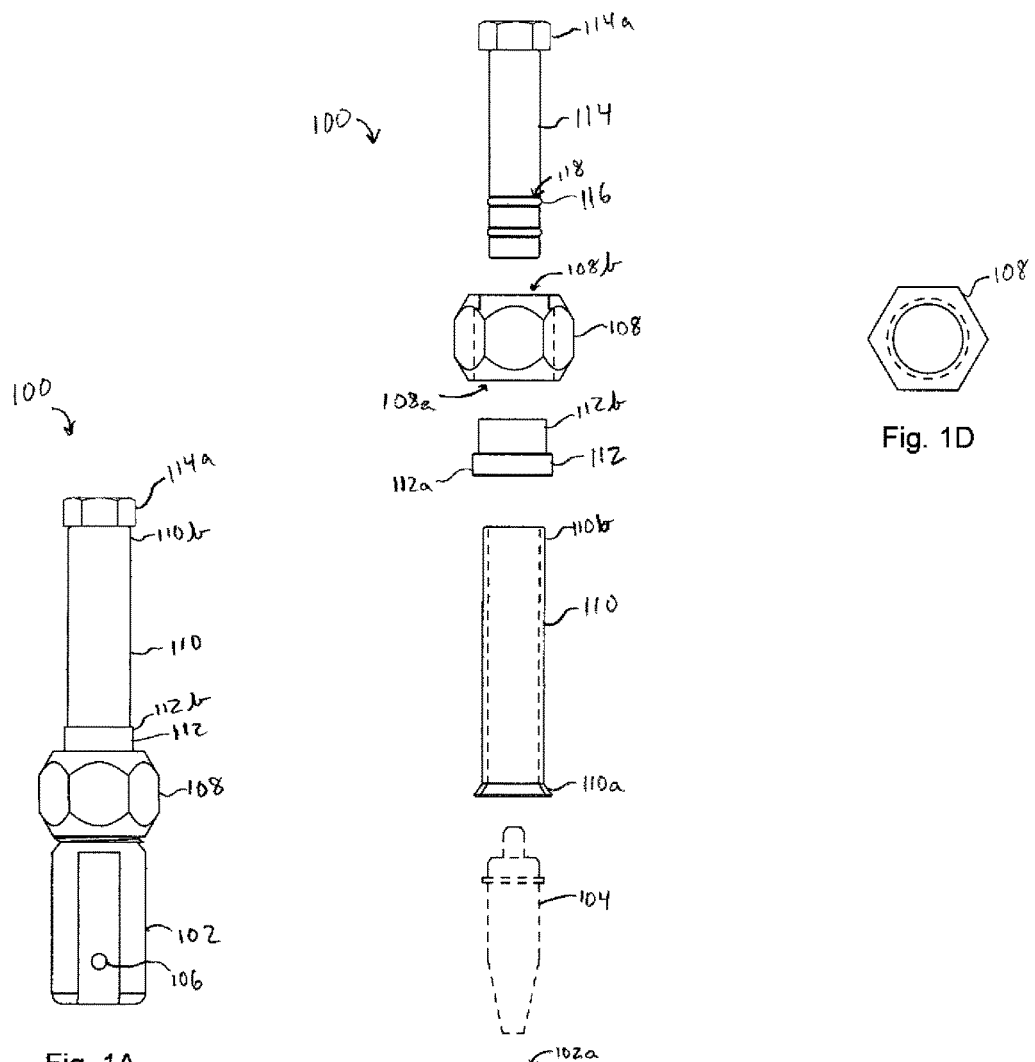
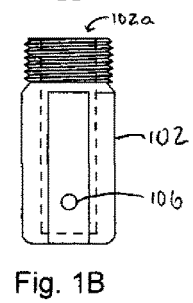
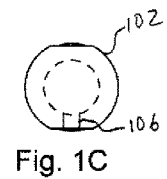
Fig. 1A
Fig. 1B
Fig. 1C
Fig. 1D

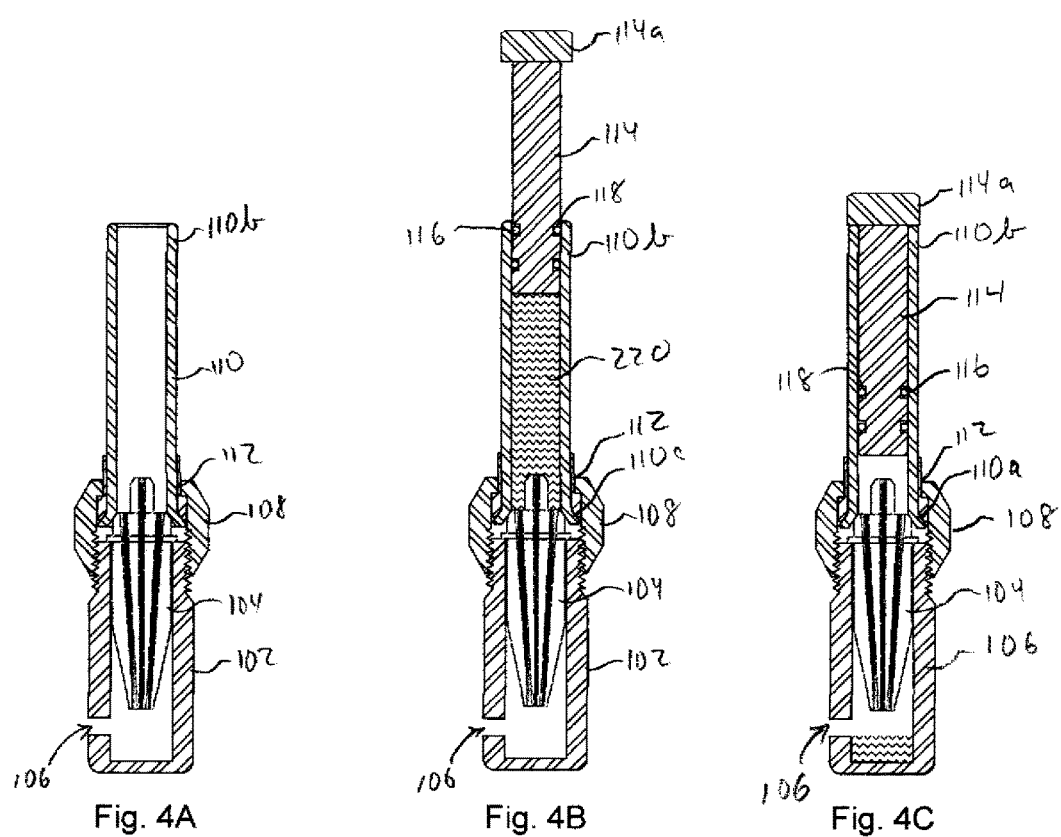

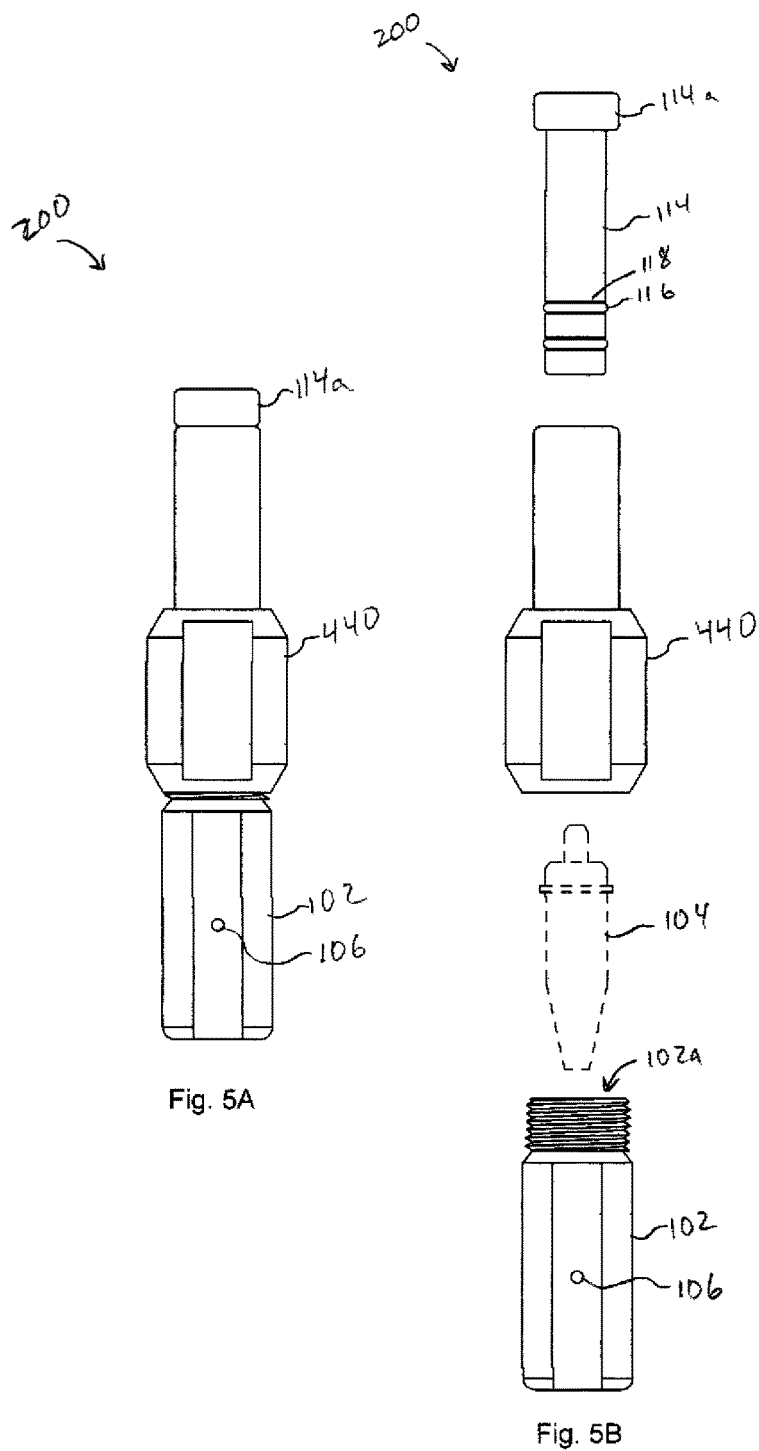
Fig. 5A
Fig. 5B
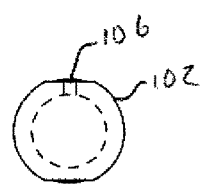
Fig. 5C
Fig. 5D

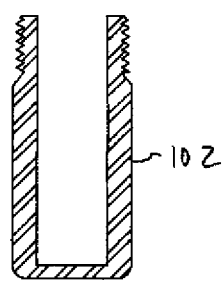
Fig. 13A
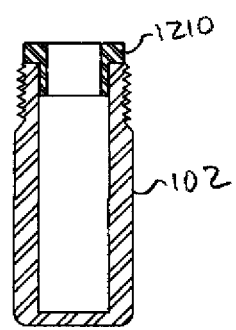
Fig. 13B

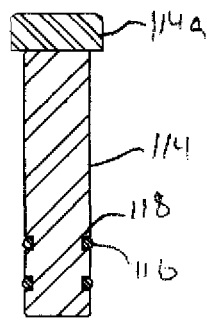
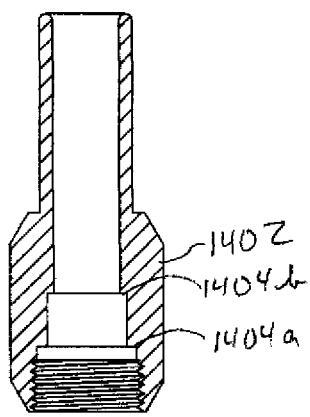
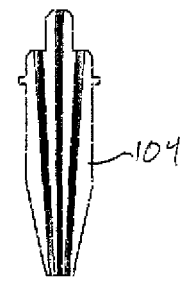
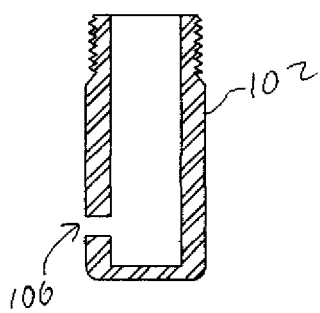
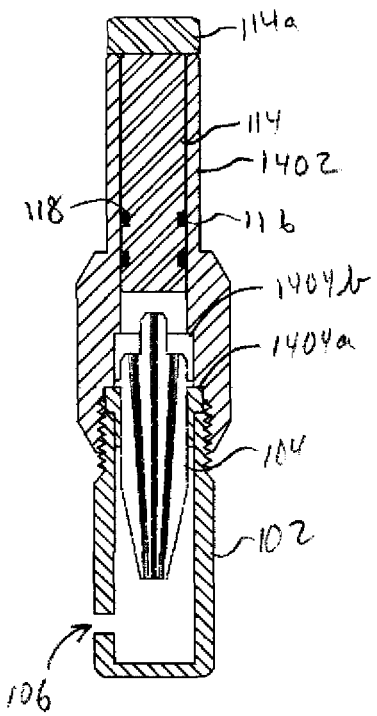
Fig. 14A    Fig. 14B

SLAG REMOVAL SYSTEM AND METHOD

This application claims the benefit of U.S. Provisional Patent Application Ser. No. 62/320,244, filed Apr. 8, 2016, entitled "Oxy-fuel Gas Cutting Torch Tip Orifice Hydraulic Slag Removal Tool," which application is incorporated herein in its entirety.

BACKGROUND

A cutting torch is frequently used in construction and manufacturing as a means to cut materials, e.g., metal structures, and/or to weld multiple pieces together to form a single integrated element. Cutting torches typically utilize one or more gases that are combined and discharged through one or more orifices in a cutting tip. When ignited, the gases provide the energy necessary to perform the desired cutting or welding action.

Slag is a byproduct that frequently occurs during the cutting process and may clog the orifice, reducing the effectiveness and useful life of the cutting tip. When this occurs, the cutting tip orifice may be cleared by inserting a drill tip into the orifice to dislodge the slag. Cleaning the cutting tip orifice in this manner, however, typically damages and distorts the cutting tip orifice shape and produces an undesirable cutting flame. More commonly, the cutting tip is disposed and replaced with a new cutting tip, increasing the cost of operations.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1A and 1B illustrate exterior views of an assembled and disassembled slag removal tool, respectively, in accordance with some embodiments.

FIGS. 1C and 1D illustrate plan views of an upper member and a lower member, respectively, in accordance with some embodiments.

FIGS. 4A-4C illustrate an operation of a slag removal tool in accordance with some embodiments.

FIGS. 5A and 5B illustrate exterior views of an assembled and disassembled slag removal tool, respectively, in accordance with some embodiments.

FIGS. 5C and 5D illustrate plan views of an upper member and a lower member, respectively, in accordance with some embodiments.

FIGS. 13A and 13B illustrate cross-sectional views of a disassembled and an assembled configuration, respectively, of a lower member and an adapter in accordance with some embodiments.

FIGS. 14A and 14B illustrate cross-sectional views of an assembled and disassembled slag removal tool, respectively, in accordance with some embodiments.

DETAILED DESCRIPTION

Figures 2A, 2B:
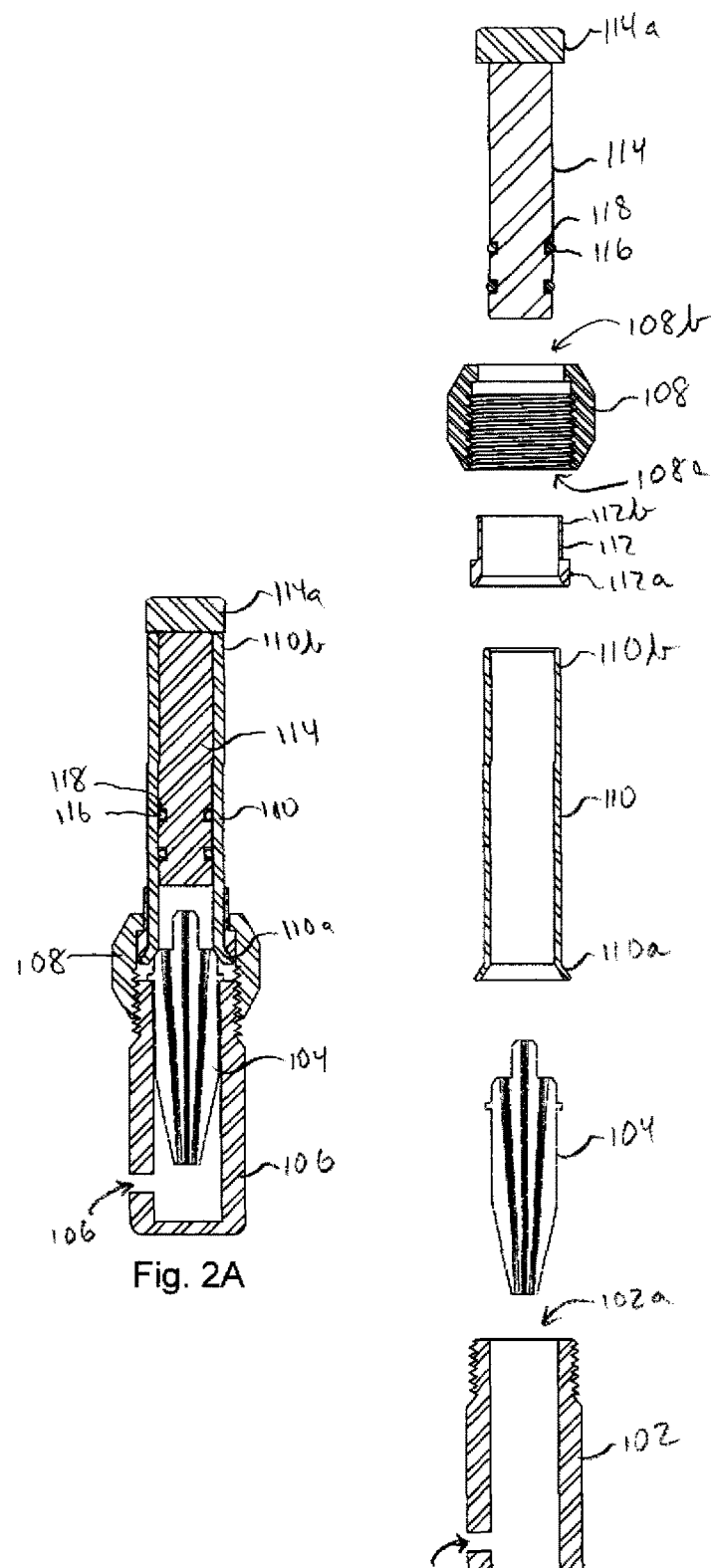
FIGS. 2A and 2B illustrate cross-sectional views of an assembled and disassembled slag removal tool, respectively, in accordance with some embodiments.

It is understood that this disclosure provides many embodiments or examples for implementing this invention. Specific examples are described below, and are not intended to be limiting. The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments disclosed herein are described in the context of a specific embodiment, namely, clearing slag from an orifice of a cutting tip. The use of clearing slag from an orifice of a cutting tip in the present disclosure is for illustrative purposes and is not meant to limit the scope of the disclosure or the scope of the claims. For example, embodiments of the present disclosure may also be applied to clearing orifices of other devices, such as orifices in welding tips, water or other liquid spouts, and the like.

Referring first to FIGS. 1A, 1B, 2A, and 2B, there is shown an assembled view and a deconstructed view of a slag removal tool 100 in accordance with some embodiments, where FIGS. 1A and 1B show an assembled view and a deconstructed view, respectively, and FIGS. 2A and 2B show a cross-sectional view of the FIGS. 1A and 1B, respectively. The slag removal tool 100 comprises a lower member 102 having a hollow cavity 102a (indicated in FIG. 1B by the dotted line in the lower member 102) configured to receive a cutting tip, e.g., cutting tip 104 shown in FIGS. 1B and 2B. The slag removal tool 100 acts upon the cutting tip 104, which is shown for purposes of illustration using dotted lines. The lower member 102 further comprises a means for releasing fluid and/or gases, such as one or more openings 106 along a circumference of a bottom region of the lower member 102. As will be described in greater detail below, the cutting tip 104 is inserted into the lower member 102 and a fluid or gas (not shown) is forced through orifices of the cutting tip 104, dislodging slag or other contaminants and unclogging the orifices of the cutting tip 104. The openings 106 provide a mechanism to release or expel the fluids and/or gases forced through the orifices.

FIGS. 1A, 1B, 2A, and 2B illustrate a single circular opening 106 for illustrative purposes, but other embodiments may utilize two or more openings or openings of various shapes and/or sizes. For example, in some embodiments one or more slots (horizontal and/or vertical) may be utilized instead of, or in addition to, the circular openings. Furthermore, in some embodiments a bottom of the lower member 102 is closed. However, in other embodiments the bottom of the lower member 102 may be open or include one or more openings.

An upper member 108 is configured to secure a tube 110 and a collar 112 to the lower member 102, as well as to the cutting tip 104. The tube 110 is hollow and includes a flared end 110a on a first end and a tubular end 110b on an opposite second end. The collar 112 is hollow as indicated by dotted lines and is configured to allow the tubular end 110b of the tube 110 to be inserted into the collar 112. The collar 112 includes a retaining ring 112a having a larger exterior diameter than a tubular end 112b. The exterior width of the flared end 110a of the tube 110 is greater than an interior width of the opening in the tubular end 112b of the collar 112, preventing the tube 110 from passing completely through the collar 112. In some embodiments, the interior profile of the collar 112 is configured to be complementary to an external profile of the flared end 110a.

In some embodiments, an interior perimeter of the flared end 110a of the tube 110 is configured to abut the cutting tip 104 and/or the lower member 102. The flared end 110a may have a beveled interior perimeter. The beveled interior perimeter of the flared end 110a allows the tube 110 to accommodate a wide variety of tip designs and diameters. The beveled interior perimeter may further be designed to provide a complementary mating surface to the cutting tip, thereby providing a better seal.

The upper member 108 has a lower opening 108a and an upper opening 108b (indicated by dotted lines). The lower opening 108a and the upper opening 108b of the upper member 108 has a diameter sufficient to allow the tubular end 110b of the tube 110 and the tubular end 112b of the collar 112 to pass through lower opening 108a of the upper member 108 as illustrated in FIGS. 1A and 2A. The upper opening 108b of the upper member 108 has a diameter smaller than an exterior width of the retaining ring 112a of the collar 112 and larger than the tubular end 112b of the collar 112.

In some embodiments, the lower member 102 is male threaded, and the upper member 108 is female threaded in such a manner to allow the lower member 102 to be securely fastened to the upper member 108. The cutting tip 104 is inserted into the lower member 102 and the flared end 110a of the tube 110 is placed on top of the cutting tip 104 such that the flared end 110a of the tube 110 abuts the cutting tip 104. The tubular end 110b of the tube 110 is placed through the collar 112, and the tubular end 110b of the tube and the tubular end 112b of the collar is placed through the lower opening 108a in the upper member 108. An interior diameter of the lower opening 108a of the upper member 108 is greater than an exterior diameter of the retaining ring 112a of the collar 112, and an interior diameter of the upper opening 108b of the upper member 108 is less than the exterior diameter of the retaining ring 112a of the collar 112. As such, the upper member 108 secures the tube 110, the collar 112, and the cutting tip 104 to the lower member 102 by securely threading the upper member onto the lower member 102.

Figure 3:
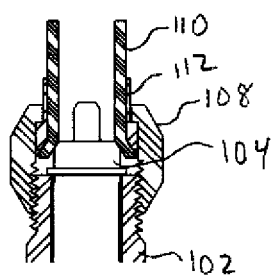
FIG. 3 illustrates a cross-sectional view of a portion of an assembled slag removal tool in accordance with some embodiments.

FIG. 3 illustrates an enlarged cross-sectional view of a portion of the tube 110, the collar 112, and the cutting tip 104 secured to the lower member 102 by the upper member 108.

Referring back to FIGS. 1A, 1B, 2A, and 2B, the slag removal tool 100 further comprises a piston 114 configured to be inserted into the tube 110. As will be discussed in greater detail below, a fluid or gas is placed in the tube and the piston 114 is placed in the tube 110 to force the fluid or gas in the tube 110 through the orifices in the cutting tip 104. As such, it is desirable to form a sufficient seal between the piston 114 and the interior sidewalls of the tube 110 such that the gas or fluid may not be easily expelled between the piston 114 and the interior sidewalls of the tube 110 and allows sufficient pressure to be generated to unclog the orifices of the cutting tip 104. In some embodiments, one or more O-rings, such as O-rings 116, may be placed along an exterior circumference of the piston 114 to aid in forming a sufficient seal. In some embodiments, the O-rings 116 are placed in underlying grooves 118 to maintain the O-rings 116 in a desired location. Two grooves 118 and O-rings 116 are illustrated in FIGS. 1B and 2B for illustrative purposes, but other embodiments may utilize fewer or more O-rings. See FIG. 7 for an illustration of the piston 114 without the O-rings 116 placed in the grooves 118.

As illustrated in FIGS. 1B and 2B, the piston 114 has a striking cap 114a, wherein a width of the striking cap 114a is greater than a width of an interior diameter of the tube 110, such that the striking cap 114a prevents the piston 114 from completely extending into the tube 110. In some embodiments, the striking cap 114a may be a separate element placed on an end of the piston 114. For example, in some embodiments an end of the piston is female threaded and the striking cap comprises a bolt threaded into the piston 114. In embodiments such as these, the striking cap 114a may be formed of a different material than the piston 114 to avoid sparking when struck in a combustible environment.

The lower member 102, the tube 110, the collar 112, the upper member 108, and the piston 114 may be generally circular in a plan view, though other shapes, such as square, octagonal, or the like, may be utilized. Furthermore, some elements may have one or more flattened surfaces to accommodate the use of tools. For example, the lower member 102 may have opposing flattened surfaces 102b to facilitate securing the lower member 102 in a vice. For illustrative purposes, FIG. 1C illustrates a bottom view of the lower member 102 in accordance with some embodiments.

Similarly, the upper member 108 may include one or more flattened surfaces 108c to accommodate the use of pliers or a wrench to secure the upper member 108 onto the lower member 102. For illustrative purposes, FIG. 1D illustrates a plan view of the upper member 108 in accordance with some embodiments.

FIGS. 4A-4C are cross-sectional views illustrating an operation of the slag removal tool 100 in accordance with some embodiments. As shown in FIG. 4A, the cutting tip 104 is inserted into the lower member 102. The tube 110 is placed on the cutting tip 104, and the collar 112 is placed over the tube 110. The upper member 108 is placed over the tube 110 and the collar 112, and the upper member 108 is threaded onto the lower member 102, thereby securing and sealing the tube 110 to cutting tip 104.

Thereafter, an unclogging material 220 is placed inside the tube 110. The unclogging material 220 may be any material that is capable of being forced through the orifices of the cutting tip 104. In some embodiments, a liquid such as water may be used. In other embodiments, other liquids and/or gases may be used. FIG. 4B further illustrates the piston 114 placed into the tube 110. Due to the size and/or clogged state of the orifices of the cutting tip 104 and the seal formed between the piston 114/O-rings 116 and the tube 110, the unclogging material 220 is retained or trapped within the tube 110 above the cutting tip 104.

FIG. 4C illustrates an application of an external force 302 to the striking cap 114a of the piston 114. The lower member 102 may be placed on a solid surface or placed into a vice to securely hold the lower member 102. The external force 302 may be applied by, for example, a hammer. The external force 302 causes the piston 114 to extend further into the tube 110, which in turn forces the unclogging material 220 through the orifices of the cutting tip. The pressure of the unclogging material 220 dislodges the slag clogging the orifices of the cutting tip 104. The unclogging material 220 is expelled from the cutting tip 104 into the lower member 102. The openings 106 allow the unclogging material to be expelled from the lower member 102, thereby preventing pressure from building up within the lower member 102 and restricting the flow of the unclogging material through the orifices of the cutting tip 104.

FIGS. 5A-6B illustrate an assembled view and a deconstructed view of a slag removal tool 200 in accordance with some embodiments, wherein like reference numerals refer to like elements as discussed above with reference to FIGS. 1A-2B. As discussed above, the slag removal tool 100 of FIGS. 1A-2B comprises five core elements: the lower member 102, the tube 110, the collar 112, the upper member 108, and the piston 114. The slag removal tool 200 of FIGS. 5A-6B illustrates that two or more of these components may be integrated into fewer components. For example, FIGS. 5A-6B illustrate that the tube 110, the collar 112, and the upper member 108 of FIGS. 1A-2B may be integrated into a single integrated upper member 440. The lower member 102 and the piston 114 (including the O-rings 116) may have similar features as discussed above with reference to FIGS. 1A-2B.

Figures 6A, 6B:
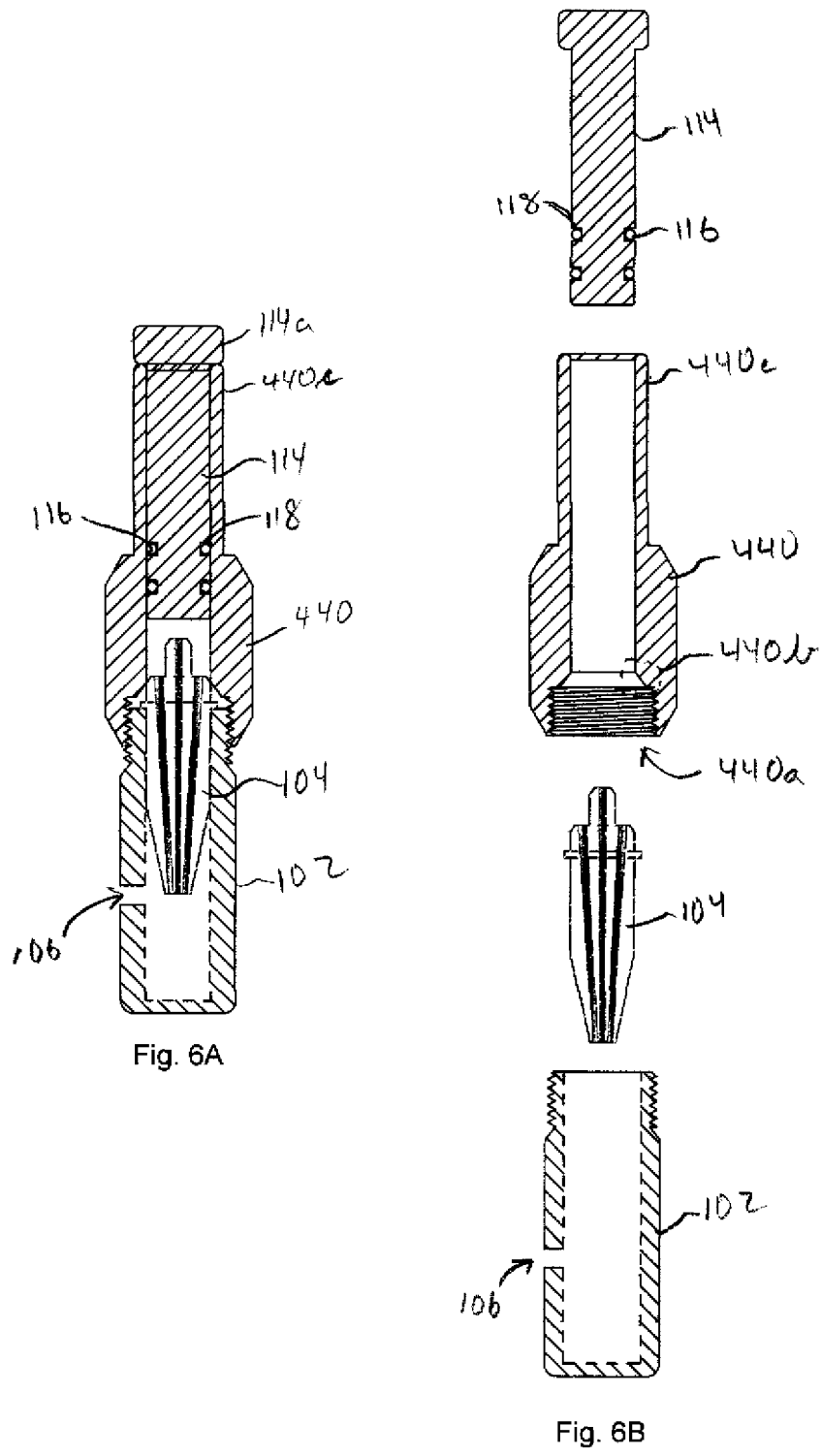
FIGS. 6A and 6B illustrate cross-sectional views of an assembled and disassembled slag removal tool, respectively, in accordance with some embodiments.

As illustrated in FIG. 6B, the integrated upper member 440 has a female-threaded end 440a configured to securely accept the male-threaded lower member 102. A hollow interior surface of the integrated upper member 440 has a flared section 440b (similar to the flared end 110a of the tube 110) extending between the female-threaded end 440a and a tube section 440c (corresponding to the tubular end 110b of the tube 110).

The operation of the embodiment illustrated in FIGS. 5A-6B is similar to that discussed above with reference to FIGS. 4A-4C and will not be repeated herein.

Figure 7A:
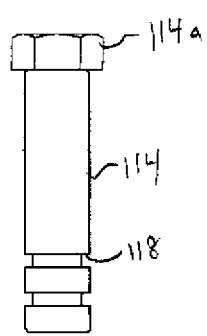
FIGS. 7A and 7B illustrate an exterior view and a cross-sectional view, respectively, of a piston in accordance with some embodiments.
Figure 7B:
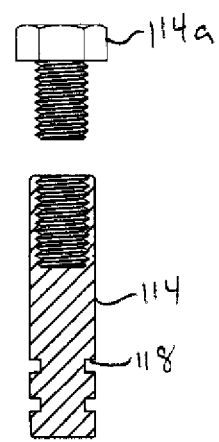

Referring now to FIGS. 7A-7B, there is shown an illustration of the piston 114 and a cross-sectional view of the piston 114, respectively, in accordance with some embodiments. As discussed above, the striking cap 114a may be configured to be threaded into a body of the piston 114, as illustrated in FIG. 7B, to allow for different materials to be utilized for the body of the piston 114 and the striking cap 114a. O-rings 116 (see, e.g., FIG. 1B) may be placed in the grooves 118.

In some embodiments, the piston 114 may be fabricated as a single, continuous element. For example, the striking cap 114a of the piston 114 may be fabricated as a single, continuous element having a profile such that the profile and cross-sectional view would be similar to that illustrated in FIG. 7A. In embodiments such as these, a coating may be placed over the striking cap 114a to provide a striking surface that is less prone to causing a spark when used in a combustible environment.

Figure 8A:
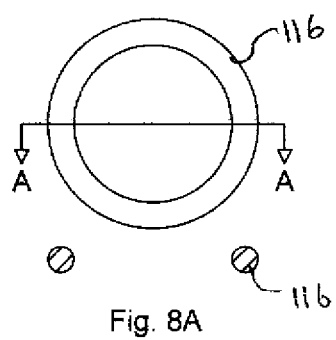
FIGS. 8A and 8B illustrate plan and cross-sectional views of an O-ring in accordance with some embodiments.
Figure 8B:
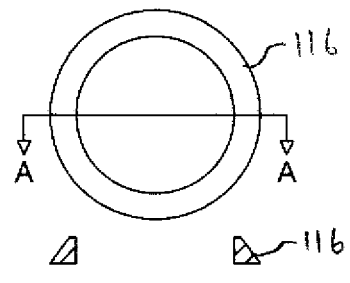

FIGS. 8A and 8B illustrate cross-sectional views of the O-rings 116 taken along the A-A line illustrated in the corresponding figure, in accordance with various embodiments. In particular, FIG. 8A illustrates that the O-rings 116 may have a circular cross-section, and FIG. 8B illustrates that the O-rings 116 may have other polygonal cross-sectional shapes. Other embodiments, however, may utilize other shapes. The O-rings 116 may be formed of an elastic material, such as rubber, silicone, a polymer, teflon, or a combination of these materials.

Embodiments such as those discussed herein may be formed of any suitable material capable of withstanding the force and pressure of a given application. For example, in some embodiments, one or more of the components may be formed by milling or molding a metallic material such as stainless steel, bronze, aluminum, titanium, or the like. In some embodiments, one or more components may be formed by compression molding or injection molding plastics, or the like. Additionally, different materials may be used to form the various components. For example, as noted above the striking cap 114a may be formed of different material such as steel, brass, aluminum, or iron and coated with a non-ferrous material such as rubber, plastic, or Teflon) for the avoidance of sparking in combustible environments. Alternatively, the striking cap 114a can be constructed entirely from a durable, non-ferrous material such as plastic.

Other designs for the various components may also be used. For example, FIGS. 9A-10B illustrate other designs for the tube 110. As discussed above, the striking cap 114a acts as a surface to which force may be applied, as well as a mechanism to prevent the piston 114 from completely entering the tube 110. The embodiments illustrated in FIGS. 9A-10B provide alternative mechanisms that may be utilized to control the depth to which the piston 114 may extend into the tube 110.

Figure 9A:
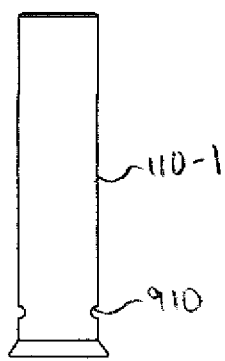
FIGS. 9A and 9B illustrate an exterior view and a cross-sectional view, respectively, of a tube in accordance with some embodiments.
Figure 9B:
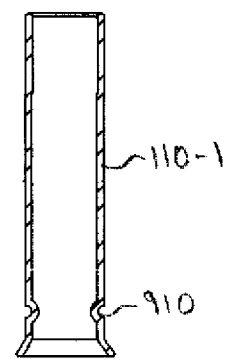

Referring first to FIGS. 9A and 9B, there is shown an exterior view and a cross-sectional view, respectively, of a tube 110-1 having an indent 910. The indent 910 effectively narrows an interior diameter of the opening through the tube 110-1 such that the piston 114 is unable to pass, thereby limiting the depth to which the piston 114 may extend into the tube 110-1. The indent 910 is positioned a sufficient distance from the tubular end 110b of the tube 110-1 to allow the piston 114 to apply adequate pressure to unclog the orifices in the cutting tip 104. For example, if the indent 910 is positioned close to the tubular end 110b, the motion of the piston 114 resulting from the force being applied to the striking cap 114a may generate an insufficient amount of pressure to unclog the orifices of the cutting tip 104.

Figure 10A:
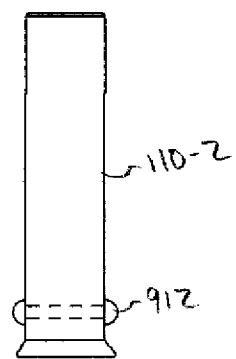
FIGS. 10A and 10B illustrate an exterior view and a cross-sectional view, respectively, of a tube in accordance with some embodiments.
Figure 10B:
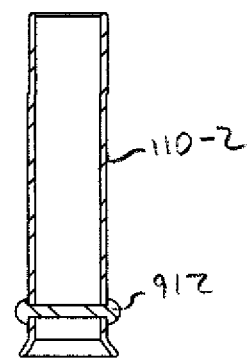

FIGS. 10A and 10B illustrate an exterior view and a cross-sectional view, respectively, of a tube 110-2 having a cross member 912. The cross member 912 serves a similar purpose as the indent 910 discussed above with reference to FIGS. 9A and 9B. As shown in FIG. 10B, the cross member 912 extends through the tube 110-2, thereby preventing the piston 114 from extending past the cross member 912.

Figure 11:
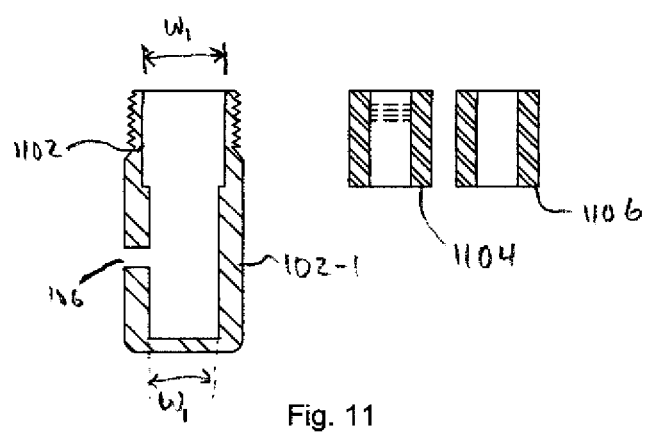
FIG. 11 illustrates cross-sectional views of a lower member and adapters in accordance with some embodiments.

FIG. 11 illustrates various embodiments to incorporate varying cutting tip 104 designs and sizes. In particular, FIG. 11 illustrates a lower member 102-1 having a recess 1102 in accordance with some embodiments. The recess 1102 has an upper width $W_1$ and a lower width $W_2$. The recess 1102 allows cutting tips having an exterior diameter of less than $W_1$ and greater than $W_2$ to be inserted into the recess 1102.

Furthermore, adapters, such as adapters 1104 and 1106, may be inserted into the recess 1102 to accommodate yet other cutting tip 104 designs and sizes. The adapter 1104 further illustrates an embodiment in which the adapter may be threaded to accept cutting tips that are threaded. The interior surface of the lower member 102 may also be similarly threaded.

Figure 12A:
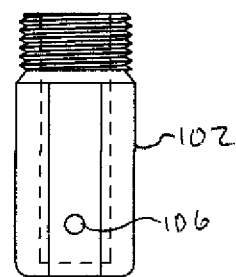
FIGS. 12A and 12B illustrate exterior views of a disassembled and an assembled configuration, respectively, of a lower member and an adapter in accordance with some embodiments.
Figure 12B:
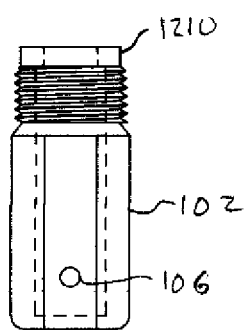

FIGS. 12A and 13B illustrate another adapter 1210 in accordance with some embodiments. FIG. 12A illustrates an exterior deconstructed view of the lower member 104 with the adapter 1210, and FIG. 12B illustrates an exterior view of the adapter 1210 inserted into the lower member 104. FIGS. 13A and 13B illustrate cross-sectional views of the structures illustrated in FIGS. 12A and 12B, respectively. The adapter 1210 may be formed of, for example, acetal plastic, hard rubber, soft rubber, non-ferrous metallic materials, combinations thereof, or the like, and inserted directly into the lower member 102 to accommodate cutting tips 104 having smaller diameters. Furthermore, various adapters may be provided having an outer diameter D1 corresponding to the inner diameter D2 of the lower member 102, and having different inner diameters D3. In this manner, various adapters may be provided to work with a single lower member 102, thereby allowing the lower member 102 to be used with many different cutting tip designs and sizes.

It should be appreciated that while the above descriptions provide a general description of various features of various embodiments, other embodiments may utilize different features. For example, as discussed above the upper member is female threaded to thread onto the male threaded lower member. In other embodiments, the upper member may be male threaded and the lower member may be female threaded.

Additionally, other embodiments may utilize other latching mechanisms. For example, a latching mechanism, e.g., a spring-loaded latch, may be used with or without the threads to secure the lower member to the upper member. Other latching mechanisms may also be used.

FIGS. 14A and 14B illustrate cross-sectional views an assembled and a deconstructed slag removal tool 300 in accordance with some embodiments, wherein like reference numerals refer to like elements as discussed above. As discussed above, the slag removal tool 200 of FIGS. 5A-6B comprises a tube portion having a tapered end transitioning into the threaded end of the upper member 440, and a similar tapered end is provided at the end of the tube 110 illustrated in FIG. 1B. In contrast, the upper member 1402 comprises a hollow core having sidewalls with indents 1404a and 1404b (collectively referred to as indents 1404). When assembled as illustrated in FIG. 14B, the indents 1404 rest upon the lower member 102 or the adapter 1210, as opposed to upon the cutting tip 104. As such, damage to the cutting tip 104 due to the torque applied during securing the upper member 108 to the lower member 102 may be prevented or reduced.

The operation of the embodiment illustrated in FIGS. 14A-14B is similar to that discussed above with reference to FIGS. 4A-4C and will not be repeated herein.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A slag removal device comprising:
   a lower member having a cavity in a first end;
   an upper structure having a first opening extending therethrough, the upper structure configured to attach to the first end of the lower member such that the first opening through the upper structure is aligned with the cavity in the lower member, wherein the upper structure comprises:
   an upper member configured to be secured to the lower member;
   a collar configured to be inserted into the upper member, the collar having a first end, the first end of the collar having a first diameter, the first diameter being less than an interior diameter of the upper member; and
   a tube configured to be inserted into the collar, the tube having a first end, the first end of the tube having a second diameter, the second diameter being greater than an interior diameter of the collar; and
   a piston configured to be inserted into the first opening of the upper structure.

2. The device of claim 1, further comprising a second opening along a sidewall of the lower member.

3. The device of claim 1, further comprising one or more O-rings on an exterior surface of the piston.

4. The device of claim 3, wherein the piston comprises one or more grooves.

5. The device of claim 1, wherein the piston comprises a striking cap, the striking cap having an exterior diameter greater than an interior diameter of a tube section of the upper structure.

6. The device of claim 1, further comprising an adapter, the adapter having a wide end and a narrow end, the narrow end having an exterior diameter less than an interior diameter of a first end of the lower member, the wide end having an exterior diameter greater than the interior diameter of the first end of the lower member.

7. A slag removal device comprising:
   a first member having a first end and a second end, an exterior surface of the first end being threaded, the first member having a cavity in the first end;
   a second member having a third end and a fourth end, the second member being hollow, the third end being threaded such that the third end of the second member is configured to be threaded onto the first end of the first member, the second member including a tube portion extending from the fourth end;
   a piston having a diameter less than an interior diameter of the tube portion of the second member; and an adapter configured to be inserted into the first member, the adapter having a wide end and a narrow end, the narrow end having an exterior diameter less than an interior diameter of the first end of the first member, the wide end having an exterior diameter greater than the interior diameter of the first end of the first member.

8. The device of claim 7, wherein the piston comprises one or more grooves, and further comprising one or more O-rings, each O-ring being configured to be placed in a respective one of the one or more grooves.

9. The device of claim 7, wherein the first member comprises one or more openings along a sidewall.

10. The device of claim 7, wherein the first member comprises opposing flat surfaces along an exterior surface.

11. The device of claim 7, wherein the second member comprises opposing flat surfaces along an exterior surface.

12. The device of claim 7, wherein the second member is a single continuous element.

13. The device of claim 7, wherein an interior surface of the second member is tapered to a narrower interior diameter from the third end.

14. The device of claim 7, wherein an interior surface of the second member comprises one or more indents, each of the one or more indents having an interior diameter less than an interior diameter of the third end.

15. The device of claim 7, wherein the second member comprises a plurality of discrete elements.

16. The device of claim 15, wherein the second member comprises:
a first structure configured to be secured to the first member;
a collar configured to be inserted into the first structure, the collar having a first end, the first end of the collar having a first diameter, the first diameter being less than an interior diameter of the first structure; and
a tube configured to be inserted into the collar, the tube having a first end, the first end of the tube having a second diameter, the second diameter being greater than an interior diameter of the collar.

17. A slag removal device comprising:
a lower member having receptacle for receiving a cutting tip;
an upper member having a first end configured to be securely attached to the lower member over the cutting tip, wherein the upper member comprises:
a first structure configured to be secured to the lower member;
a collar configured to be inserted into the first structure, the collar having a first end, the first end of the collar having a first diameter, the first diameter being less than an interior diameter of the first structure; and
a tube configured to be inserted into the collar, the tube having a first end, the first end of the tube having a second diameter, the second diameter being greater than an interior diameter of the collar; and
a piston configured to extend into the tube of the upper member.

18. The device of claim 17, further comprising an adapter configured to be inserted into the receptacle of the lower member, the adapter configured to receive the cutting tip.

19. The device of claim 17, wherein the lower member comprises an opening along a sidewall, the opening being in communication with the receptacle.

20. The device of claim 17, wherein the upper member is configured to be threaded onto the lower member.

* * * * *